United States Patent Office
3,017,409
Patented Jan. 16, 1962

3,017,409
17α,21-ETHOXYMETHYLENE DIOXY PREGNANES AND PROCESS FOR THEIR PREPARATION
Robert Joly, Montmorency, and Julien Warnant, Neuilly-sur-Seine, France, assignors to Les Laboratoires Francais de Chimiotherapie, Paris, France, a corporation of France
No Drawing. Filed July 6, 1960, Ser. No. 41,035
Claims priority, application France Aug. 20, 1959
4 Claims. (Cl. 260—239.55)

The present invention relates to novel steroid derivatives, namely 17α,21-ethoxymethylene dioxy steroids of the pregnane series of the Formula A:

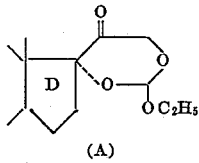

(A)

and a process for their preparation. In this formula only the D ring is shown, since the novel substitution relates only to the 17 and 21-hydroxy groups, the A, B and C rings of the pregnane molecule may be substituted by ketone, hydroxy, halogen, etc., with the exception of the hydroxy group in the 11β-position, which is characterized by its tendency to dehydrate in the presence of acid agents.

It is known that the corticosteroids which actually constitute the most important group of the steroid hormones are charcterized by the presence of a ketol chain and a tertiary hydroxy group on the D ring and have the Formula B:

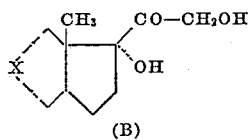

(B)

wherein X represents the remaining A, B and C rings of the pregnane molecule. This grouping is generally introduced before the other characteristic functions of these products such as the α,β-conjugated ketone funcion of the A ring, the 11β-hydroxy group, the 11β-hydroxy- 9α-fluoro groups or methyl in the 6-position.

However, the ketol function is rather unstable in the presence of oxidation and reduction reagents and the hydroxy group in the 17-position is readily esterified in the presence of a strong enolization agent and, where esterified, is very difficult to regenerate by saponification, and also it dehydrates very readily in the presence of certain dehydrating agents.

It is an object of this invention to obtain 17α,21-ethoxymethylene dioxy steroids of the pregnane series having the formula

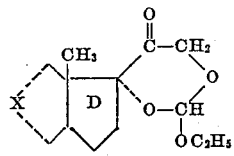

wherein X represents the remaining A, B and C rings of the pregnane molecule, said A, B and C rings being selected from the group consisting of saturated rings, mono-ene unsaturated rings and di-ene unsaturated rings and containing substituents selected from the group consisting of hydrogen, oxo, lower alkoxy, lower alkanoyloxy, halo, hydroxy and combinations thereof, with the proviso that an 11β-hydroxy substituted C ring in the starting material is dehydrated to the 9–11 mono-ene form.

A further object of the invention is the development of a process for the preparation of 17α,21-ethoxymethylene dioxy steroids of the pregnane series having the formula

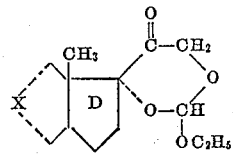

wherein X represents the remaining A, B and C rings of the pregnane molecule, said A, B and C rings being selected from the group consisting of saturated rings, mono-ene unsaturated rings ad di-ene unsaturated rings and containing substituents selected from the group consisting of hydrogen, oxo, lower alkoxy, lower alkanoyloxy, halo, hydroxy and combinations thereof, with the proviso that an 11β-hydroxy substitued C ring in the starting material is dehydrated to the 9–11 mono-ene form.

A still further object of the invention is the development of a process for protecting the 17a,21-dihydroxy function of a corticosteroid while subjecting the corticosteroid to chemical synthesis steps.

Another object of the invention is the preparation of
(a) 17α,21-ethoxymethylene dioxy-3-ethoxy-$\Delta^{3,5}$-pregnadiene-11,20-dione
(b) 17α,21-ethoxymethylene dioxy-$\Delta^{1,4}$-pregnadiene-3,11,20-trione
(c) 17α,21-ethoxymethylene dioxy-3-ethoxy-$\Delta^{3,5,9(11)}$-pregnatriene-20-one.

These and other objects of the invention will become more apparent as the description thereof proceeds.

We have found, in accordance with the present invention, an easy and convenient method for protecting the hydroxy groups in the 17α- and 21-positions, all while rendering the keto group in the 20-position less reactive. This is accomplished by reacting an excess of ethyl orthoformate $HC(OC_2H_5)_3$ with a steroid of the pregnane series of the Formula B in the presence of an acid catalyst such as a strong organic acid, like p-toluene sulfonic acid or a mineral acid, such as sulfuric acid, in an inert atmosphere. If the starting steroid has a ketone function in the 3-position, this ketone function is transformed at the same time into an enol ether group, unless it is a ketone function which is conjugated twice with a double bond such as in the case of $\Delta^{1,4}$-3-keto steroids, in which case the keto group does not react with ethyl orthoformate. A ketone function in the 11-position has a low reactivity and is not transformed by the ethyl orthoformate. A hydroxy group in the 11β-position is partially or completely dehydrated in the course of the reaction.

The blockage of the 17α,21-dihydroxy groups having been effected, oxidation, reduction, dehydration, epoxidation, halogenation, etc., reactions may be effected upon the steroid in question and, after the synthesis is terminated, the ketol chain and the hydroxy group in the 17α-position are regenerated by acid hydrolysis, which at the same time liberates the ketone function in the 3-position if it is in the form of an enol ether.

The utility of the novel compounds according to the invention is therefore essentially that of intermediate products, but this does not exclude a use based on their pharmacological properties.

In accordance with one preferred embodiment of the invention, ethyl orthoformate is reacted either directly with the 17α,20-dihydroxylated steroid or in the presence of an inert organic solvent, such as the aromatic hydrocarbons, benzene or toluene, at a temperature in the neighborhood of room temperature, preferably between 0 and 30° C. under a stream of nitrogen and in the presence of p-toluene sulfonic acid. The desired compound generally crystallizes and may be purified by recrystallization from a slightly alkaline medium, as in the case of acetals.

Among starting steroid compounds of the Formula B which can be used in the process of the invention are cortisone, prednisone, prednisolone, cortisol, cortexolone, Reichstein compounds C, D and V, pregnane-17α,21-diol-3,11,20 - dione, pregnane - 3β,5α,17α,21-tetraol-11,20-dione, 4-chloro-pregnane-11β,17α,21-triol-3,20-dione, 3β-formyloxy - Δ⁵ - pregnene-17α,21-diol-20-one, 2α-methyl cortisol, 6α-methyl prednisolone and many others.

The structural formulas of he products produced from cortison, prednisone and cortisol are shown in the Table I.

The following examples illustrate the invention without, however, limiting it. It is to be understood that changes and modifications known to those skilled in the art can be made without exceeding the scope of the invention. The melting points are instantaneous melting points determined on a Maquenne block.

TABLE I

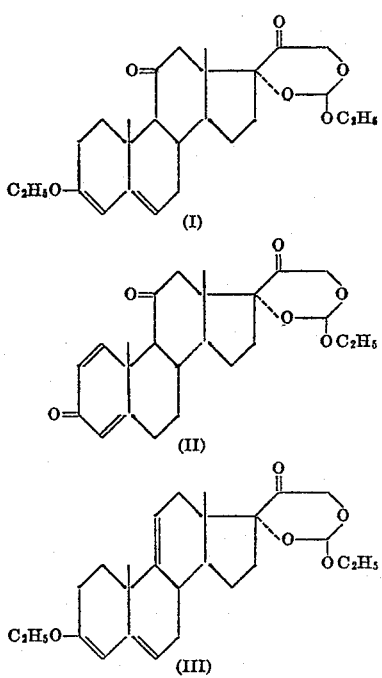

EXAMPLE I

*Preparation of 17α,21-ethoxymethylene dioxy-3-ethoxy-Δ³,⁵-pregnadiene-11,20-dione, I*

1 g. of cortisone was suspended in 5 cc. of ethyl orthoformate under a stream of nitrogen and accompanied by mechanical agitation, 5 mg. of p-toluene sulfonic acid monohydrate were added to the suspension. The temperature was maintained at room temperature for eight hours without interrupting either the flow of gas or the agitation. The reaction mixture turned green and the suspension changed in appearance. After allowing to stand overnight, 1 cc. of triethylamine was added, which caused the contents of the flask to turn pink. The mixture was vacuum filtered and the filter cake was washed by trituration with ethanol containing 1% triethylamine. After drying, 1.05 g. of the desired 17α,21-ethoxymethylene dioxy-3-ethoxy-Δ³,⁵-pregnadiene-11,20-dione, I, was obtained, that is a yield of 85%. For analysis, the product was recrystallized from boiling ethanol containing 1% triethylamine. Compound I, thus obtained, had a melting point of 154° C. and a specific rotation $$[\alpha]_D^{20} = -37° \pm 1$$

(c.=1% in chloroform containing 1% pyridine), and was soluble in chloroform, slightly soluble in alcohol and insoluble in water and dilute aqueous alkalis.

*Analysis.*—$C_{26}H_{36}O_6$: Molecular weight = 444.5 Calculated: C, 70.24%; H, 8.16%. Found: C, 70.1%, H, 8.1%.

This compound is not described in the literature.

On subjecting Compound I to acetylation, no modification of the physical or chemical properties of the product occurred, which proved that the hydroxy group in the 21-position was blocked. The infra-red spectrum agreed with the indicated structure.

RECONVERSION INTO CORTISONE 0.5 g. of Compound I was dissolved in a mixture of 1 cc. of acetic acid and 1 cc. of water by heating the mixture to 95° C. At the end of twenty minutes of heating, the beginning of crystallization could be noted, which increased upon cooling. The mixture was diluted with water. The crystals were separated by vacuum filtration, washed with water and dried. 0.355 g. of cortisone were obtained (that is a yield of 87%) having a melting point 235° C. The compound obtained did not produce a depression of the melting point in admixture with standard cortisone and exhibited the same rotatory power:

$$[\alpha]_D^{20} = +207.5° \pm 2.5$$

(c.=0.5% in 95% ethanol).

EXAMPLE II

*Preparation of 17α,21-ethoxymethylene dioxy-Δ¹,⁴-pregnadiene-3,11,20-trione, II*

A mixture consisting of:

Prednisone _____g__ 3
Ethyl orthoformate _____cc__ 15
p-Toluene sulfonic acid monohydrate _____g__ 0.03 was maintained for seven hours at 20–25° C. under a stream of nitrogen, accompanied by mechanical agitation.

The suspension was silk colored, without any apparent transformation in the structure. The p-toluene sulfonic acid was neutralized by adding a few drops of triethylamine. The crystals of the suspension were separated by vacuum filtration and were washed with methanol containing 1% triethylamine. After drying, 2.92 g. of desired 17α,21 - ethoxymethylene dioxy - Δ¹,⁴ - pregnadiene-3,11,20-trione, II, were obtained, which was sufficiently pure to be directly employed. For analysis, the compound was recrystallized from hot ethanol containing 1% triethylamine. After icing the solution, separating the precipitate by vacuum filtration and drying it, the pure product was obtained, having a melting point of 212° C. and a specific rotation $[\alpha]_D^{20} = +168° \pm 3$ (c. = 0.5% in chloroform containing 1% pyridine), and a λ max = 238, mμ, ε = 15,320 (ethanol). The product was soluble in 22 volumes of hot alcohol and insoluble in water and alkalis. Acids decomposed it while regenerating prednisone.

*Analysis.*—$C_{24}H_{30}O_6$: Molecular weight = 414.48. Calculated: C, 69.54%; H, 7.30%; O, 23.16%. Found: C, 69.7%; H, 7.3%; O, 23.0%.

This compound is not described in the literature.

EXAMPLE III

*Preparation of 17α,21-ethoxymethylenedioxy-3-ethoxy-Δ³,⁵,⁹⁽¹¹⁾-pregnatriene-20-one, III*

By treating cortisol in accordance with the method described in Examples I and II, and recrystallizing the product from ethanol containing 1% triethylamine, 17α,21-ethoxymethylene dioxy-3-ethoxy-Δ³,⁵,⁹⁽¹¹⁾-pregnatriene-20-one, III, was obtained having a melting point of 195° C. and a specific rotation $[\alpha]_D^{20} = -135° \pm 2$ (c. = 0.5% in chloroform containing 1% pyridine). The infra-red spectrum showed the absence of a hydroxy group, therefore, dehydration in the 9,11-position had taken place. The product was slightly soluble in alcohol, insoluble in water and dilute aqueous alkalis and was decomposed by acids to regenerate $\Delta^{4,9(11)}$-pregnadiene-17$\alpha$,21-diol-3,20-dione.

*Analysis.*—$C_{26}H_{36}O_5$: Molecular weight = 428.55. Calculated: C, 72.86%; H, 8.47%. Found: C, 72.6%; H, 8.4%.

Compound III is not described in the literature.

17$\alpha$,21-ethoxymethylene dioxy-3-ethoxy-$\Delta^{3,5,9(11)}$-pregnatriene-20-one, III, can be transformed into 9$\alpha$-fluorocortisol by the known processes such as forming the bromohydrin, dehydrobrominating to the 9,11-oxido compound, hydrofluorinating and regenerating by acid treatment.

The preceding specific embodiments are illustrative of the invention. They are not to be deemed limitative in any respect. Such changes and modifications as would occur to one skilled in the art can be made to the specific embodiments without departing from the spirit of the invention or the scope of the appended claims.

What is claimed is:
1. 17$\alpha$,21 - ethoxymethylene dioxy - 3 - ethoxy-$\Delta^{3,5,9(11)}$-pregnatriene-20-one.
2. The process of producing 17$\alpha$,21-ethoxymethylene dioxy steroids of the pregnane series having the formula

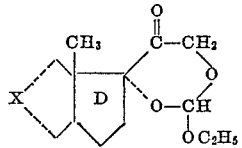

wherein X represents the remaining A, B and C rings of the pregnane molecule, said A, B and C rings being selected from the group consisting of saturated rings, mono-ene unsaturated rings and di-ene unsaturated rings and containing substituents selected from the group consisting of hydrogen, oxo, lower alkoxy, lower alkanoyloxy, halo, hydroxy and combinations thereof, with the proviso that an 11$\beta$-hydroxy substituted C ring in the starting material is dehydrated to the 9–11 mono-ene form, which comprises the steps of reacting a 17$\alpha$,21-dihydroxy-20-keto steroid of the pregnane series having the formula

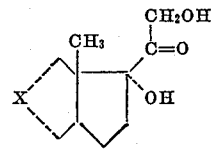

wherein X represents the remaining A, B and C rings of the pregnane molecule, said A, B and C rings being selected from the group consisting of saturated rings, mono-ene unsaturated rings and di-ene unsaturated rings and containing substituents selected from the group consisting of hydrogen, oxo, lower alkoxy, lower alkanoyloxy, halo, hydroxy and combinations thereof, with an excess of ethyl orthoformate in an inert atmosphere in the presence of an acid catalyst, and recovering said 17$\alpha$,20-ethoxymethylene dioxy steroid.
3. The process of claim 2 wherein said acid catalyst is p-toluene sulfonic acid.
4. The process of claim 2 wherein said inert atmosphere is a nitrogen atmosphere.

References Cited in the file of this patent

UNITED STATES PATENTS 2,889,321     Bergstrom et al.     June 2, 1959

OTHER REFERENCES

Smith et al.: J.A.C.S. 82, 4625 (September 1960).